US007295636B2

(12) United States Patent
Onggosanusi et al.

(10) Patent No.: US 7,295,636 B2
(45) Date of Patent: Nov. 13, 2007

(54) LINEAR SINGLE-ANTENNA INTERFERENCE CANCELLATION RECEIVER

(75) Inventors: Eko N. Onggosanusi, Allen, TX (US); Anand G. Dabak, Plano, TX (US); Timothy M. Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 722 days.

(21) Appl. No.: 10/747,461

(22) Filed: Dec. 29, 2003

(65) Prior Publication Data
US 2004/0192215 A1 Sep. 30, 2004

Related U.S. Application Data

(60) Provisional application No. 60/458,245, filed on Mar. 28, 2003, provisional application No. 60/509,891, filed on Oct. 9, 2003.

(51) Int. Cl.
*H03D 1/04* (2006.01)
(52) U.S. Cl. ................. 375/346; 375/285; 375/350; 455/296
(58) Field of Classification Search ............... 375/346, 375/350; 455/67.13
See application file for complete search history.

(56) References Cited

U.S. PATENT DOCUMENTS 6,363,104 B1 * 3/2002 Bottomley .............. 375/148

| 6,515,980 | B1 * | 2/2003 | Bottomley ............... 370/342 |
| 7,031,411 | B2 * | 4/2006 | Arslan et al. ............ 375/346 |
| 7,107,031 | B2 * | 9/2006 | Kristensson et al. ...... 455/296 |
| 7,133,476 | B2 * | 11/2006 | Arslan et al. ............ 375/346 |
| 7,187,736 | B2 * | 3/2007 | Buckley et al. .......... 375/350 |
| 2003/0123381 | A1 * | 7/2003 | Zhuang et al. ........... 370/208 |

FOREIGN PATENT DOCUMENTS

WO          WO01/93439          * 12/2001

OTHER PUBLICATIONS

Slock, "An interference cancelling multichannel matched filter", in Communications Theory Mini-Conference in conjunction with Globecom, p. 214.*
Parker, "Space-time autoregressive filtering for matched subspace STAP", IEEE Transactions on Aerospace and Electronic Systems, pp. 510-520.*
Benjamin, "airborne radar interference suppression using adaptive three-dimensional techniques", May 2002.*

(Continued)

*Primary Examiner*—Temesghen Ghebretinsae
*Assistant Examiner*—Juan Alberto Torres
(74) *Attorney, Agent, or Firm*—Ronald O. Neerings; W. James Brady, III; Frederick J. Telecky, Jr.

(57) ABSTRACT

System and method for interference cancellation in a digital wireless communications system. A preferred embodiment comprises sampling a received signal wherein the received signal is real-valued, rotating the sampled received signal by a specified amount, extracting in-phase and quadrature phase streams from the rotated, sampled received signal, applying an interference suppression filter and combining the filtered streams. The output of the combining operation can be de-correlated (by whitening) if there is excessive correlation.

38 Claims, 6 Drawing Sheets

OTHER PUBLICATIONS

Paulray "Space-time processing for wireless communications", IEEE Signal Processing Magazine, 14(6): 49-83, 1997.*
"GSM Technical Specification: Digital Cellular Telecommunications System (Phase 2+); General Description of GSM Public Land Mobile Network (PLMN)," GSM 01.02, Revision 5.0.0, Mar. 1996, European Telecommunications Standards Institute, Valbonne, France.

* cited by examiner

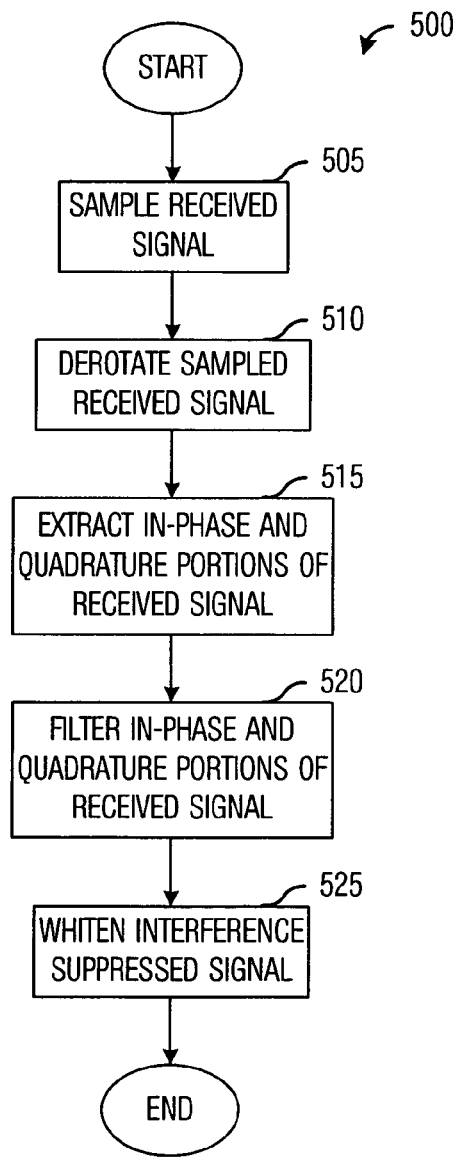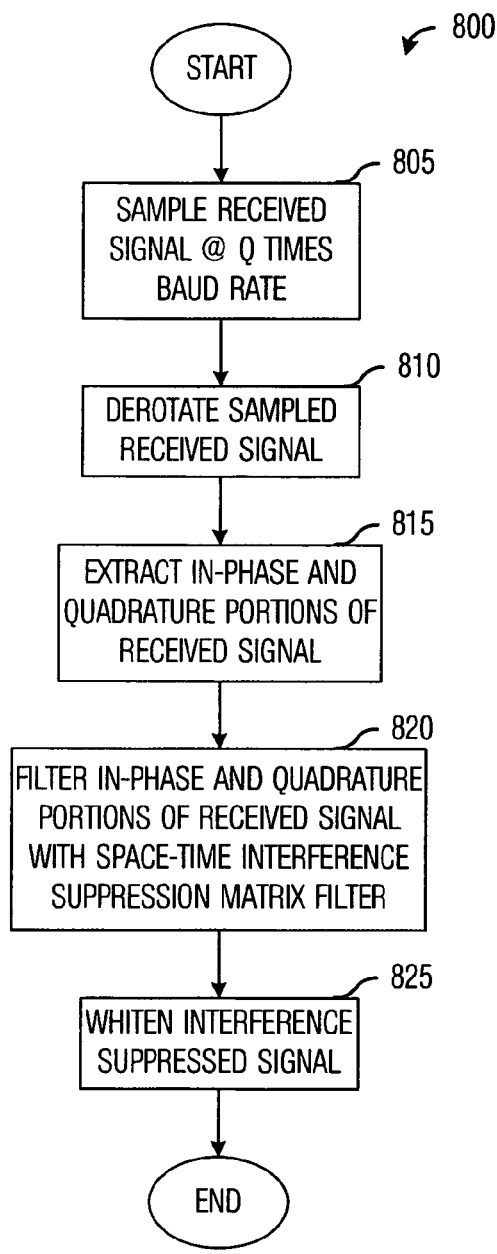
Fig. 5
Fig. 8

LINEAR SINGLE-ANTENNA INTERFERENCE CANCELLATION RECEIVER

This application claims the benefit of U.S. Provisional Application No. 60/458,245, filed Mar. 28, 2003, entitled "Linear Single-Antenna Interference Cancellation Receiver for GSM Systems", and Application No. 60/509,891, filed Oct. 9, 2003, entitled "Another Blind Single-Antenna Interference Cancellation Receiver for GSM Systems" which applications are hereby incorporated herein by reference.

CROSS-REFERENCE TO RELATED APPLICATIONS

This application is related to the following and commonly assigned patent applications: Ser. No. 10/738,508, filed Dec. 17, 2003, entitled "Interferer Detection and Channel Estimation for Wireless Communications Networks;" Ser. No. 10/732,978, filed Dec. 11, 2003, entitled "Multiuser Detection for Wireless Communications Systems in the Presence of Interference," which applications are hereby incorporated herein by reference.

TECHNICAL FIELD

The present invention relates generally to a system and method for digital wireless communications, and more particularly to a system and method for providing interference cancellation in a digital wireless communications system.

BACKGROUND

Interference is a major source of concern for the designers of wireless communications systems. Interference can reduce the overall performance of the communications system and if severe enough, cause the communications system to fail altogether. Interference can come from other electrical and electronic devices operating in the general vicinity and from other devices in the same communications system, which are transmitting in the same (or adjacent) frequency band.

Interference from other devices in the same communications system can become a problem as designers of the communication system attempt to increase network capacity. For example, one way to increase network capacity is to increase frequency reuse, i.e., allow devices that are relatively close to one another to transmit in the same frequency band. In cellular communications systems, adjacent cell sites typically do not operate in the same frequency bands. However, through cell site sectoring, frequency reuse can be increased, therefore increasing network capacity. Unfortunately, when devices, which are close to one another, transmit in the same frequency band or in adjacent frequency bands, interference can occur. When devices transmit within the same frequency band, co-channel interference can occur, while adjacent channel interference can occur if devices transmit in adjacent bands if sufficient inter-band spacing is not provided.

Additionally, when multiple users are transmitting, the information may become mixed together and it may be necessary to extract one (or more) user's information from a received signal. For receivers with multiple antennas, linear schemes can be used to extract the desired information. The use of linear schemes in receivers with single antennas may be difficult if not impossible without the aid of additional signal manipulation.

In a GSM (Global System for Mobile Telephony) wireless communications system, for example, information is transmitted in transmission bursts, wherein each transmission burst may consist of two packets of data bits with a 26 bit mid-amble located in between the two packets. According to the GSM technical standards, one of eight possible training sequence codes (TSC) can be used as the mid-amble. In GSM communications systems, attempts to increase system capacity have resulted in increased co-channel and adjacent channel interference. Several attempts to reduce interference have been proposed. Most of the prior art relies on using at least two antennas at the receiver to suppress interference. However, due to cost reasons there is generally only one antenna in GSM handsets. With a single antenna at the receiver, one single antenna interference cancellation (SAIC) technique is to use the joint MLSE receiver.

A disadvantage of the prior art is that the schemes which provide significant performance gain require the channel information of the interferers. This may not be available since in general the identity of the interferers is unknown. In a synchronous network, this may require an algorithm capable of detecting the presence and identity of the interferer(s). In an asynchronous network, attaining such information is generally infeasible.

SUMMARY OF THE INVENTION

These and other problems are generally solved or circumvented, and technical advantages are generally achieved, by preferred embodiments of the present invention which provides for a system and method for providing interference cancellation in wireless communications systems.

In accordance with a preferred embodiment of the present invention, a method for eliminating interference in a received signal comprising sampling the received signal, rotating the sampled received signal by a specified amount, extracting in-phase and quadrature phase streams from the rotated, sampled received signal, applying an interference suppression filter to the in-phase and quadrature phase streams, and combining the filtered in-phase and quadrature phase streams is provided.

In accordance with another preferred embodiment of the present invention, a method for eliminating interference in a received signal comprising sampling the received signal, wherein the sampling is at a sampling rate that is not less than a symbol rate of the received signal, rotating the sampled received signal by a specified amount, extracting in-phase and quadrature phase streams from the rotated, sampled received signal, and applying an interference suppression filter to the in-phase and quadrature phase streams is provided.

In accordance with another preferred embodiment of the present invention, a circuit comprising a sampling unit coupled to a signal input, the sampling unit containing circuitry to sample a received signal provided by the signal input at a specified sampling rate, a rotating unit coupled to the sampling unit, the rotating unit containing circuitry to rotate the sampled received signal by a specified amount, a pair of extractors coupled to the rotating unit, the extractors containing circuitry to extract an in-phase and a quadrature phase stream from an output of the rotating unit, and a filter coupled to the pair of extractors, the filter containing circuitry to suppress interference present in the received signal is provided.

An advantage of a preferred embodiment of the present invention is the interference cancellation can make use of single antenna receivers, therefore, existing receivers can be used.

A further advantage of a preferred embodiment of the present invention is that spectral redundancy available in many modulation schemes can be exploited to provide an additional degree of freedom to assist in interference cancellation. The additional degree of freedom can effectively operate as a "virtual" antenna to make a single antenna receiver behave like a two antenna receiver.

Yet another advantage of a preferred embodiment of the present invention is that further techniques can be used to provide greater degrees of freedom. These additional degrees of freedom can add additional "virtual" antennas to a single antenna receiver, permitting the use of interference cancellation techniques that typically require a large number of antennas.

Yet another advantage of a preferred embodiment of the present invention is that implementation can be achieved without requiring the channel information and identity of the interferers. Only the desired user channel information is used. Hence, the techniques are applicable for asynchronous networks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a diagram of a process for interference cancellation in a receiver, according to a preferred embodiment of the present invention;

FIG. 8 is a diagram of a process for interference cancellation in a receiver, according to a preferred embodiment of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a GSM network operating in synchronous mode. The GSM technical standard can be found in a series of technical documents, wherein a general description can be found in Document 01.02, entitled "General Description of GSM Public Land Mobile Network (PLMN), Revision 6.0.0" published January 2001, which is incorporated herein by reference. The invention may also be applied, however, to other wireless communications networks which make use of real-valued modulation schemes such as GMSK, BPSK, and M-PAM. Examples of these networks include but are not limited to GSM-EDGE, GPRS, and so on.

Figure 1:
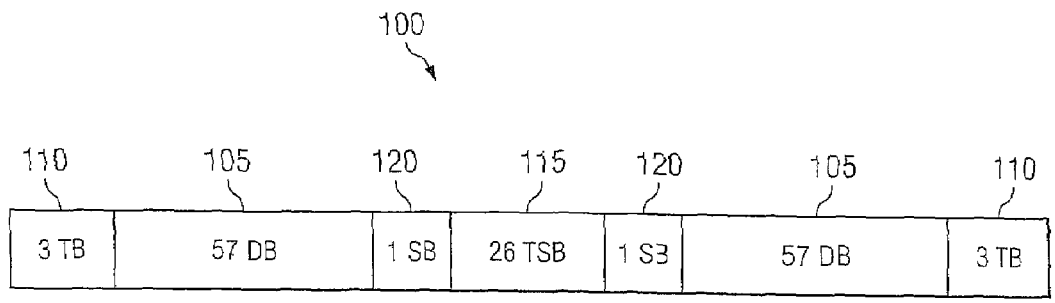
FIG. 1 is a diagram of a transmission burst in a GSM communications system.

With reference now to FIG. 1, there is shown a diagram illustrating a transmission burst 100 in a GSM communications system. Data transmitted in the transmission burst 100 are carried in a pair of 57-bit data fields 105. Two 3-bit fields, referred to as tail bit fields 110, can be used to keep adjacent transmission bursts separate. In many wireless communications systems, transmissions are usually preceded with a field located at the beginning of the transmission. This field is commonly referred to as a preamble and can be used to carry a specific sequence of bits (typically referred to as a training sequence) that can help a receiver detect and decode the transmission. Note that while the use of a preamble is common, it is not the only place within in a transmission to place a training sequence. For example, in a GSM transmission burst, the training sequence is located in the middle of the transmission burst. The transmission burst 100 contains a 26-bit training sequence field 115, which may be separated from the pair of 57-bit data fields 105 by a pair of stealing bit fields 120. Since the training sequence is not at the beginning of the transmission, it referred to as being a mid-amble. Note that the discussion of field specifics (the number of bits in a field, the position of a field, and so forth) is used to enable the discussion using a currently available wireless communications system. It should be evident that the field specifics should have no impact upon the validity of the present invention.

Figure 2:
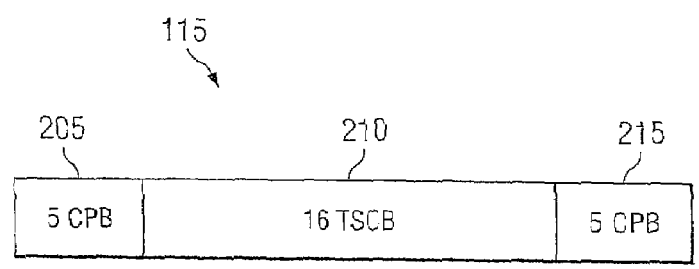
FIG. 2 is a diagram of a detailed view of the 26-bit GSM training sequence field.

With reference now to FIG. 2, there is shown a diagram illustrating a detailed view of the GSM 26-bit training sequence field 115. The GSM 26-bit training sequence field 115 can be broken up into three smaller fields, a 5-bit cyclic prefix field 205, a 16-bit training sequence field 210, and a 5-bit cyclic postfix field 215. According to the GSM technical standards, the 5-bit cyclic prefix field 205 contains a copy of the last 5 bits of the 16-bit training sequence field 210 while the 5-bit cyclic postfix field 215 contains a copy of the first 5 bits of the 16-bit training sequence field 210. According to the GSM technical specifications, there are up to eight (8) unique training sequences that may be used in a single GSM communications system.

As discussed previously, interference from other devices from within the same communications network can come in two forms, co-channel and adjacent channel interference. Regardless of the form of interference, the net result may be that the overall performance of the source of the interference and receiver of the interference may be degraded since the transmissions of both the device causing the interference and the device being interfered with are being damaged. Since the number of training sequences is limited (eight in the case of a GSM communications system), it can be possible to use the a priori knowledge of the training sequences to improve the channel estimation performance at a receiver.

Figure 3:
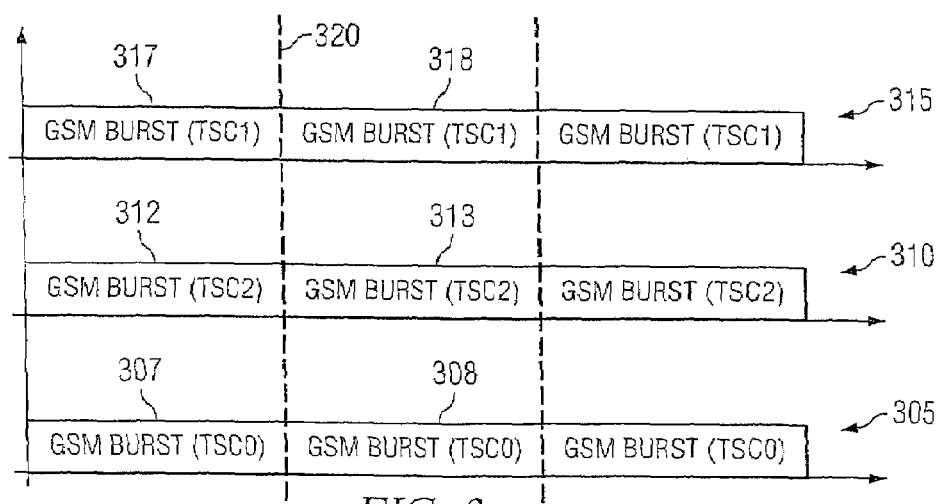
FIG. 3 is a diagram of the transmissions from three GSM devices with no timing offset.

With reference now to FIG. 3, there is shown a diagram illustrating the transmissions of three GSM devices, wherein there is no timing offset. Each of three sets of axes (305, 310, and 315) display a series of GSM transmission bursts from a single device. Note that each device uses a different training sequence; TSC0 for the transmission displayed on axis 305, TSC2 for the transmission displayed on axis 310, and TSC1 for the transmission displayed on axis 315. Note that the GSM communications system displayed in FIG. 3 is a synchronous system, wherein all of the devices transmit at essentially the same time. For example, first GSM transmission bursts 307, 312, and 317 are all transmitted at the same time, as are second GSM transmission bursts 308, 313, and 318. Also note that there is no (or less than a single symbol) timing offset between the transmissions of the three devices. A vertical line 320 denotes the beginning of the second GSM transmission bursts 308, 313, and 318 in all three devices.

Note that it may be possible that a timing offset exists between the arrival times of transmissions from different devices. A timing offset may exist even if transmissions within a wireless communications system are designed to occur at the same time. For example, if a clock of a transmitter has drifted away from clocks of other transmitters, then the transmitter with the inaccurate clock can begin its transmission at an incorrect time. Alternatively, differences in the distance traveled by various transmissions (propagation delay) can also account for a timing offset. For example, even if transmissions are initiated at the same time, a transmission that is traveling a long distance will arrive later than a transmission that is traveling a short distance. A timing offset can vary from nanoseconds to milliseconds. When a timing offset is large, it can sometimes be expressed in terms of symbol intervals (an amount of time equal to the transmission of a single symbol).

Figure 4:
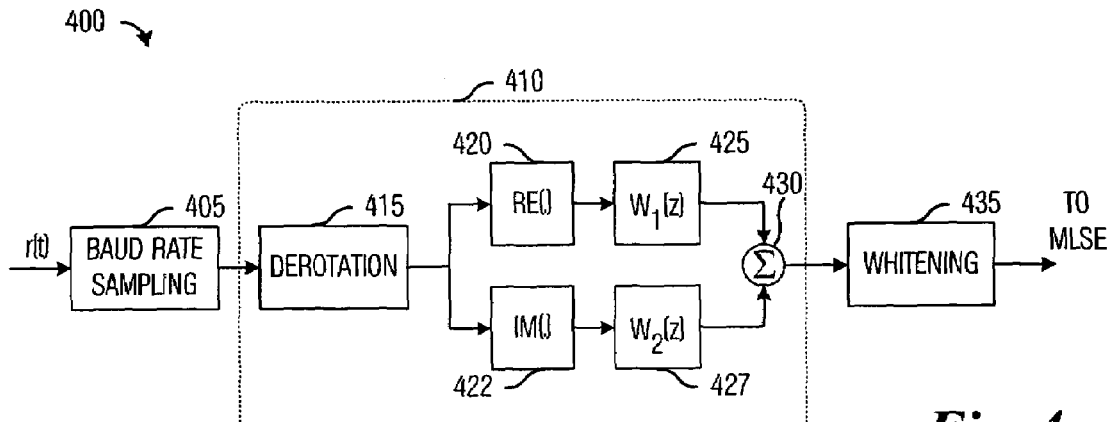
FIG. 4 is a diagram of a portion of a receiver, according to a preferred embodiment of the present invention.

With reference now to FIG. 4, there is shown a diagram illustrating a portion of a receiver 400, wherein addition signal manipulation can be used to provide an additional degree of freedom to assist in interference cancellation, according to a preferred embodiment of the present invention. FIG. 4 provides a high-level view of circuitry responsible for interference cancellation in the receiver 400. Note that FIG. 4 does not show typical parts that may be found in a receiver, such as an antenna, radio frequency hardware, decoding hardware, and so forth. A received signal, r(t), as received by an antenna (not shown) of the receiver 400 and after filtering to remove out-of-band interferers and amplifying to bring signal levels to a compatible level by radio frequency hardware (also not shown), may be sampled at baud-rate by a baud-rate sampling unit 405. The sampling of the received signal creates a discrete time sequence representing the received signal. After the sampling, the discrete time sequence can be provided to a linear interference suppression unit 410. According to another preferred embodiment of the present invention, sub-baud rate processing can be used in place of baud-rate processing.

The linear interference suppression unit 410 can include a derotation unit 415, which can be used to apply a specified rotation to the discrete time sequence. After derotation, the discrete time sequence can be provided to a real-valued unit 420 and an imaginary-valued unit 422, which can be responsible for extracting the real portion and the imaginary portion of the discrete time sequence, e.g., the discrete time sequence can be split into two sequences, with one sequence containing the real portion of the discrete time sequence and the other sequence containing the imaginary portion of the discrete time sequence. The real sequence can represent an in-phase portion and the imaginary sequence can represent a quadrature portion of the discrete time sequence.

Each of the two sequences (the real sequence and the imaginary sequence) can then undergo filtering via two filter units 425 and 427. A detailed explanation of the operation of the filter units 425 and 427 is provided below. After filtering, the two sequences can be recombined by a combining unit 430. A net effect of the filtering by the filter units 425 and 427 and the combining unit 430 is interference suppression. After combining, the output may be colored. If the coloring is severe, then the output may be whitened (de-correlated) by a whitening unit 435 prior to minimum least squares error equalization.

For discussion purposes, a signal model, along with assumptions and notation shall be laid out. Note that the signal model presented below is for a GSM communications system. However, a comparable signal model can be provided for other types of communications systems. A baseband received signal can be sampled at a baud (symbol) rate to facilitate discrete-time processing. A Gaussian Minimum Shift Keying (GMSK) modulated signal can be accurately approximated using a linear approximation expressible as:

$$x(t) = \sum_{p=-\infty}^{\infty} j^{p+1} a_p C_0(t - pT), \, a_p \in \{\pm 1\},$$

wherein T is a single symbol duration and $C_0(t)$ is the GMSK waveform of duration 4T. Assuming that there are $\tilde{K}$ co-channel users in the communications system, the baseband receive signals can be expressed as:

$$\tilde{r}(t) = \sum_{k=1}^{\tilde{K}} \sum_{p=-\infty}^{\infty} j^{p+1} a_{k,p} \tilde{h}_k(t - pT) + \tilde{n}(t),$$

$$\tilde{r}_m = \tilde{r}(mT) = j^{m+1} \sum_{k=1}^{\tilde{K}} \sum_{l=0}^{L} (j^{-l} \tilde{h}_{k,l}) a_{k,m-l} + \tilde{n}_m,$$

wherein $\tilde{h}_0(t)$ is the overall channel impulse response including $C_0(t)$, $\tilde{h}_l = \tilde{h}(lT)$, and LT is the channel delay spread.

With reference now to FIG. 5, there is shown a diagram illustrating a process 500 for interference cancellation in a receiver, wherein addition signal manipulation can be used to provide an additional degree of freedom to assist in interference cancellation, according to a preferred embodiment of the present invention. A received signal, r(t), after being received by a receiver and sampled (block 505) at a sampling rate essentially equal to the received signal's baud rate can be expressed as:

$$\tilde{r}_m = \tilde{r}(mT) = j^{m+1} \sum_{k=1}^{K} \sum_{l=0}^{L} (j^{-l} \tilde{h}_{k,l}) a_{k,m-l} + \tilde{n}_m$$

Note that $a_k$ can be modulated using binary phase shift keying (BPSK) and therefore is real-valued.

Two independent real-valued channels can be obtained from $\tilde{r}_m$ by first performing a derotation (block 510) with a factor of $(-j)^{m+1}$ followed by extracting a real (in-phase) and imaginary (quadrature) part of the resulting signal (block 515). The two independent real-valued channels can be expressed in vector form as:

$$\begin{bmatrix} \text{Re}(j^{-(m+1)}\tilde{r}_m) \\ \text{Im}(j^{-(m+1)}\tilde{r}_m) \end{bmatrix} = \sum_{k=1}^{K}\sum_{l=0}^{L} \begin{bmatrix} \text{Re}(j^{-l}\tilde{h}_l^{(k)}) \\ \text{Im}(j^{-l}\tilde{h}_l^{(k)}) \end{bmatrix} a_{m-l}^{(k)} + \begin{bmatrix} \text{Re}(j^{-(m+1)}\tilde{n}_m) \\ \text{Im}(j^{-(m+1)}\tilde{n}_m) \end{bmatrix} \Leftrightarrow \quad (1)$$

$$r_m = \sum_{k=1}^{K}\sum_{l=0}^{L} h_l^{(k)} a_{m-l}^{(k)} + \tilde{n}_m = \sum_{k=1}^{K} [h_0^{(k)} \ h_1^{(k)} \ \ldots \ h_L^{(k)}] a_{m-l}^{(k)} + \tilde{n}_m.$$

This effectively provides a single-input 2-output real-valued channel. Essentially, the spectral redundancy stemming from the fact that $a_k$ is a real-valued symbol is exploited. It can be shown that the two independent real-valued channels (shown above) are uncorrelated from one another. The same holds true for the noise components. Note that the GMSK-specific feature above may arise from the GMSK waveform, $C_0(t)$, and the rotation $(-j)^{m+1}$. The above technique of exploiting spectral redundancy can also be applicable to any general real-valued modulation scheme such as BPSK and M-PAM. For BPSK and M-PAM, the derotation (for example, as performed by the derotation unit 415 (FIG. 4)) may not be needed. In this case, the sampled received signal can be directly processed by in-phase and quadrature extractors (for example, the real-valued unit 420 and an imaginary-valued unit 422 (FIG. 4)).

The additional degree of freedom (achieved by exploiting the spectral redundancy and creating two independent real-valued channels from the received signal) can be used to fully suppress a single interferer. Alternatively, if there is more than one interferer, then the single degree of freedom can be used to partially suppress the multiple interferers. The interference suppression can be performed by filtering the two independent real-valued channels and then combining the results of the filtering (block 520). The filters ($w_1(z)$ and $w_2(z)$) can have N+1 taps, which can result in an increase in the number of states for the MLSE equalizer by a factor of $2^N$ times. A detailed discussion of the filters ($w_1(z)$ and $w_2(z)$) is provided below.

The filters ($w_1(z)$ and $W_2(z)$) can be chosen to suppress interference. Several different criteria can be used, such as, zero-forcing (ZF), minimum mean square error (MMSE), and maximum signal to interference plus noise ratio (SINR). The following describes a design of the filters using a maximum SINR criteria. Proceeding from equation (1) above, set the number of taps for each filter to N+1 and let:

$$r_m = \begin{bmatrix} \tilde{r}_m \\ \tilde{r}_{m-1} \\ \vdots \\ \tilde{r}_{m-N} \end{bmatrix} \in \mathcal{R}^{2(N+1)},$$

$$n_m = \begin{bmatrix} \tilde{n}_m \\ \tilde{n}_{m-1} \\ \vdots \\ \tilde{n}_{m-n} \end{bmatrix} \sim RealGaussian\left[O_{2(N+1)}, \frac{\sigma^2}{2} I_{2(N+1)}\right],$$

$$a_m^{(k)} = \begin{bmatrix} a_m^{(k)} \\ a_{m-1}^{(k)} \\ \vdots \\ a_{m-L-N}^{(k)} \end{bmatrix} \in BPSK^{L+N+1}$$

Then, $$r_m = \sum_{k=1}^{K} H_k a_m^{(k)} + n_m \quad (2)$$

$$= H_1 a_m^{(1)} + \sum_{k=2}^{K} H_k a_m^{(k)} + n_m$$

$$= H_1 a_m^{(1)} + v_m$$

where $H_k$ is the $2(N+1) \times (L+N+1)$ block Toeplitz matrix formed from $\{h_0^{(k)}, h_1^{(k)}, \ldots, h_L^{(k)}\}$.

The combined filter (combining both filters $w_1(z)$ and $w_2(z)$) $w = [w_{1,0} \ w_{2,0} \ w_{1,1} \ w_{2,1} \ \ldots \ w_{1,N} \ w_{2,N}]^T \in \mathfrak{R}^{2(N+1)}$ operates upon the two independent real-valued channels to produce a single stream output as follows:

$$y_m = w^T r_m = w^T H_1 a_m^{(1)} + w^T v_m = u^T a_m^{(1)} + w^T v_m \quad (3)$$

where u denotes the effective desired user channel after interference suppression. In this case, the SINR can be defined as:

$$SINR = \frac{E[(u^T a_m^{(1)})^2]}{E[(w^T r_m - u^T a_m^{(1)})^2]}. \quad (4)$$

It can be shown that a SINR-maximizing solution is expressible as:

$$w = R_{rr}^{-1} H_1 u, u = evec_{max}[H_1^T R_{rr}^{-1} H_1]$$

$$R_{rr}^{-1} = E[r_m r_m^T] = \sum_{k=1}^{K} H_k H_k^T + \frac{\sigma^2}{2} I_{2(N+1)} \quad (5)$$

where $evec_{max}[X]$ denotes the eigenvector for matrix X corresponding to the maximum eigenvalue. Note that by definition in equation (3), $$u = H_1^T w. \quad (6)$$

When channel estimates of all K users are available (e.g., via joint least-squares channel estimation and knowledge of training sequences for the users), the above solution can simply use the channel estimates to derive an optimal combining filter. In blind implementation, where only a channel estimate of the desired user is available (e.g., via a single user channel estimation), the data covariance matrix, $C_{rr}$, can be estimated via the sample covariance matrix by averaging multiple snapshots of $r_m r_m^T$.

The solution discussed above can permit a blind adaptive implementation using a wide variety of adaptive filtering techniques. This can be possible by noting that for a given u, w is essentially a linear MMSE filter that minimizes the mean square error in the denominator of SINR (equation (4)). The solution may begin with an initial estimate for u, then adaptively obtain w, and then refine u using equation (6). This may be done iteratively. An adaptive implementation can be beneficial, especially for time-varying channels (wherein the channel varies significantly within one transmission burst) and highly asynchronous networks (wherein the interferers and hence the interferer's channels and statistics change within a transmission burst).

Using the training code sequence of the desired user, it can also be possible to obtain a SINR-maximizing solution, wherein SINR is defined in a deterministic sense, rather than a stochastic sense as in equation (4). Collecting M snapshots of $r_m$ in equation (2) within a period of the training code sequence (for a GSM communications system, the training code sequence is made up of 26 symbols per transmission burst), $$[r_0 \ r_1 \ \ldots \ r_{M-1}] = H_1[a_0^{(1)} \ a_1^{(1)} \ \ldots \ a_{M-1}^{(1)}] + [v_0$$
$$v_1 \ldots v_{M-1}] \Leftrightarrow R = H_1 A_1 + V. \quad (7)$$

Similar to the stochastic approach, the combining filter can operate as follows:

$$y^T = w^T R = w^T H_1 A_1 + w^T V = u^T A_1 + w^T V.$$

The deterministic SINR can then be defined as:

$$SINR = \frac{\|u^T A_1\|^2}{\|w^T R - u^T A_1\|^2}. \quad (8)$$

It can be shown that the SINR-maximizing solution in this case is:

$$w = (RR^T)^{-1} RA_1^T u, \ u = \text{evec}_{max}[(A_1 A_1^T)^{-1} A_1 R^T (RR^T)^{-1} RA_1^T]. \quad (9)$$

It can be shown that the above solution can be equivalent to:

$$w = \text{evec}_{max}[(RR^T)^{-1} RA_1^T (A_1 A_1^T)^{-1} A_1 R^T]$$

$$u = (A_1 A_1^T)^{-1} A_1 R^T w = \hat{H}_1^T w,$$

Wherein $\hat{H}_1$ is the single user least square channel estimate of the desired user. Therefore, if a better channel estimate can be obtained via a different method, it can be used in place of $\hat{H}_1$. Additionally, this shows that channel estimation can be performed separately from SINR maximization.

After interference suppression (filtering and combining) and before being provided to an MLSE equalizer, it may be necessary to whiten (de-correlate) the interference suppressed signal (block 525). The interference suppressed signal can be severely colored (as a result of the filtering and combining operations). If this is the case, then the interference suppressed signal can be whitened (for example, by a whitening unit 435 (FIG. 4)). Severe coloring can impact the performance of MLSE. The whitening can be implemented adaptively using linear prediction filtering. Alternatively, it can be shown that the correlating function of the residual interference (plus noise) takes the following form:

$$C(\Delta) = w^T \left( \sum_{k=2}^{K} H_k D_\Delta H_k^T + \frac{\sigma^2}{2} \delta_\Delta I_{2(N+1)} \right) w,$$

wherein $D_\Delta$ is the shifted identity matrix. A whitening filter can then be derived using spectral factorization. Note that the process 500 may not be limited to co-channel interference suppression alone, the process 500 can also suppress adjacent channel interference. Notice that the above correlation function depends on the interferer(s)'s channel information. Alternatively, the whitening filter can be derived from a linear prediction formulation where the interference is modeled as an auto-regressive (AR) process with order-N, where (N+1) is the whitening filter length. Using this formulation, the whitening filter can be derived from the interference estimate (received signal minus desired signal obtained from the TSC and/or decision feedback) without requiring the channel information of the interferer(s).

Figure 6:
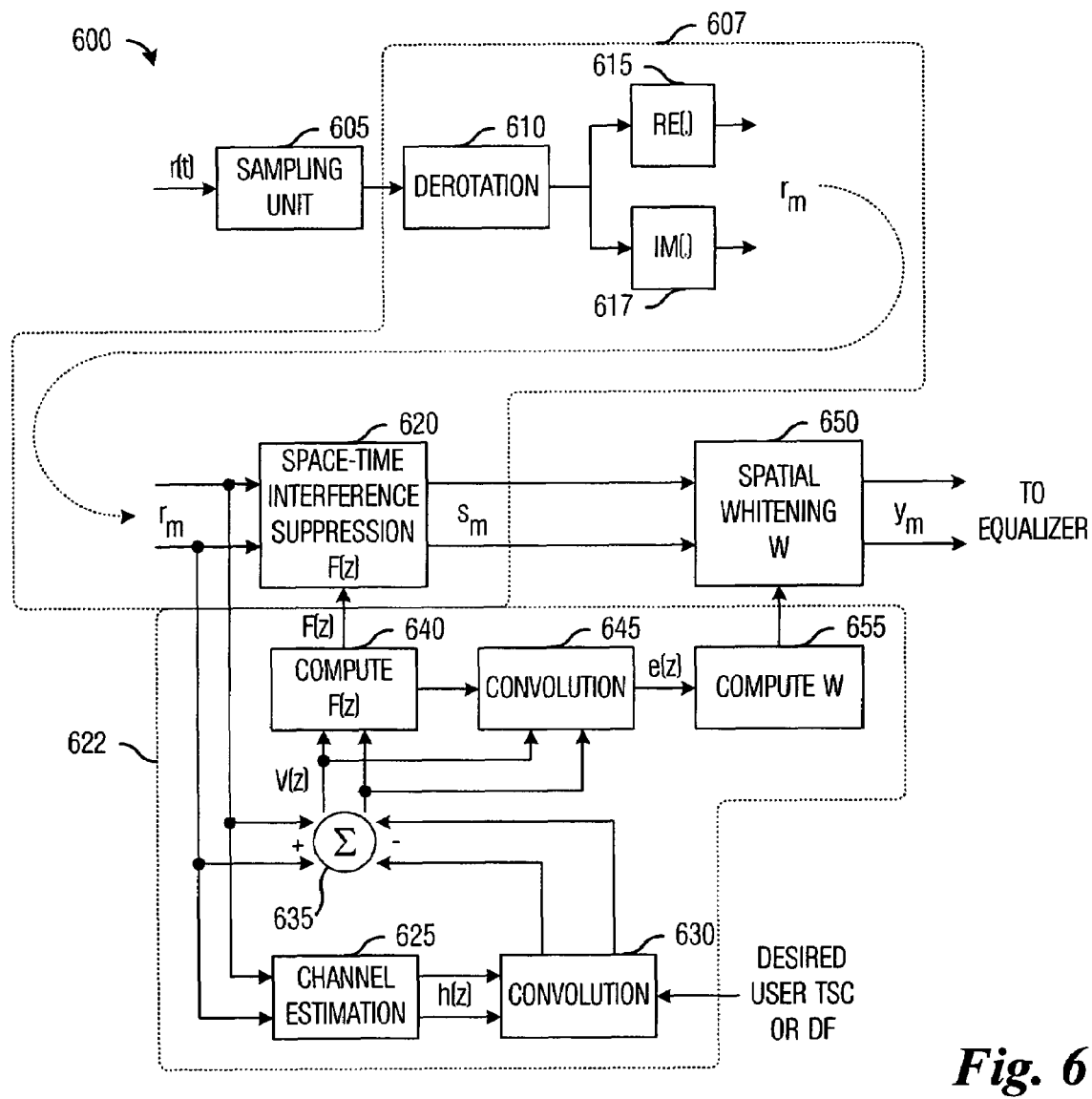
FIG. 6 is a diagram of a portion of a receiver, according to a preferred embodiment of the present invention.

With reference now to FIG. 6, there is shown a diagram illustrating a portion of a receiver 600, wherein addition signal manipulation can be used to provide multiple additional degrees of freedom to assist in interference cancellation, according to a preferred embodiment of the present invention. FIG. 6 provides a high-level view of circuitry responsible for interference cancellation in a receiver 600. Note that FIG. 6 does not show typical parts that may be found in a receiver, such as an antenna, radio frequency hardware, decoding hardware, and so forth. Previously, the multiple stream input signals (the I and Q streams) may be processed into a single stream upon interference suppression. The receiver 600 attempts to preserve those multiple streams upon interference suppression. A received signal, r(t), as received by an antenna (not shown) of the receiver 600 and after filtering to remove out-of-band interferers and amplifying to bring signal levels to a compatible level by radio frequency hardware (also not shown), may be sampled at a rate greater than baud-rate by a sampling unit 605, meaning that the received signal, r(t), is being oversampled. For example, the received signal may be oversampled by a factor of 2x, 4x, 6x, 8x, or any integral multiple of the baud-rate. The sampling of the received signal creates a discrete time sequence representing the received signal. After the sampling, the discrete time sequence can be provided to a space-time interference suppression unit 607.

The space-time interference suppression unit 607 can include a derotation unit 610, which can be used to apply a specified rotation to the discrete time sequence. After derotation, the discrete time sequence can be provided to a real-valued unit 615 and an imaginary-valued unit 617, which can be used for extracting the real portion and the imaginary portion of the discrete time sequence. The real sequence can represent an in-phase portion and the imaginary sequence can represent a quadrature portion of the discrete time sequence. The two sequences (the real sequence and the imaginary sequence) can then undergo filtering by a space-time interference suppression filter 620, which makes use of a matrix filter. Note that once again, the spectral redundancy of a GMSK modulated signal has been exploited to provide an additional degree of freedom. However, by oversampling the received signal by a factor of Q, an additional (Q−1) degrees of freedom can be provided. Furthermore, the splitting of the discrete time sequence into two sequences doubles the degrees of freedom to a total of 2(Q−1) degrees of freedom. The output of the space-time interference suppression unit 607 may be colored and if the coloring is severe enough, a spatial whitening unit 650 can be used to whiten the output prior to being provided to an equalizer (not shown).

The space-time interference suppression unit 607 and the spatial whitening unit 650 can have as input an interference suppression filter matrix, F(z), and a spatial whitener, W, respectively. Both the interference suppression filter matrix, F(z), and the spatial whitener, W, can be computed from the discrete time sequence and a training sequence of the desired user and then provided to the space-time interference suppression unit 607 and the spatial whitening unit 650 by a channel estimation and computing unit 622.

The channel estimation and computing unit 622 can include a channel estimation unit 625, which can compute a channel estimate, h(z), from the discrete time signal. The channel estimation (produced by the channel estimation unit 625) can then be provided to a convolution unit 630, wherein it can be convolved with the training code sequence of the desired user (snapshots of which can be taken from the received signal). Output of the convolution unit 630 can be combined by a combining unit 635 with the discrete time signal to produce an interference component, V(z). The interference component, V(z), can be used to compute the interference suppression matrix, F(z), by a interference suppression matrix compute unit 640. The interference component, V(z), can also be used to compute the spatial whitener, W, by convolving it (via a convolution unit 645, for example) with the interference suppression matrix, F(z), to produce a residual interference after interference suppression, e(z). The residual interference after interference suppression, e(z), can then be provided to a spatial whitener compute unit 655, wherein the spatial whitener, W, is computed. Note that details of the computations will be discussed below. An alternative embodiment of the receiver circuitry 600 can be found displayed in FIG. 7.

Once again, to discuss the design of the receiver 600, a signal model, along with assumptions and notation shall be laid out. As discussed previously, a GMSK modulated signal can be approximated as:

$$x(t) = \sum_{p=-\infty}^{\infty} j^{p+1} a_p C_0(t - pT), \; a_p \in \{\pm 1\},$$

wherein T is a single symbol duration and $C_0(t)$ is the GMSK waveform of duration 4T. Assuming that there are $\tilde{K}$ co-channel users in the communications system, the baseband receive signals can be expressed as:

$$\tilde{r}(t) = \sum_{p=-\infty}^{\infty} j^{p+1} a_p^{(1)} \tilde{h}^{(1)}(t - pT) + \sum_{k=2}^{K} \sum_{p=-\infty}^{\infty} j^{p+1} a_p^{(k)} \tilde{h}^{(k)}(t - pT) + \tilde{n}(t)$$

$$= \sum_{p=-\infty}^{\infty} j^{p+1} a_p^{(1)} \tilde{h}^{(1)}(t - pT) + \tilde{v}(t),$$

wherein $\tilde{h}(t)$ is the overall channel impulse response, including $C_0(t)$ with delay spread LT, $\tilde{n}(t)$ is the thermal noise, and $\tilde{v}(t)$ is the total interference plus noise.

With reference now to FIG. 8, there is shown a diagram illustrating a process 800 for interference cancellation in a receiver, wherein addition signal manipulation can be used to provide multiple additional degrees of freedom to assist in interference cancellation, according to a preferred embodiment of the present invention. A received signal, r(t), after being received by a receiver and sampled (block 805) at a sampling rate Q times the received signals baud rate can be expressed as:

$$\tilde{r}_m = \begin{bmatrix} \tilde{r}_{Qm} \\ \tilde{r}_{Qm+1} \\ \vdots \\ \tilde{r}_{Qm+(Q-1)} \end{bmatrix}, \text{ where } \tilde{r}_{Qm+q} = \tilde{r}\left(\frac{(Qm+q)T}{Q}\right). \quad (10)$$

It can then be shown that $$\tilde{r}_m = \sum_{p=-\infty}^{\infty} j^{p+1} a_p^{(1)} \begin{bmatrix} \tilde{h}^{(1)}((m-p)T) \\ \tilde{h}^{(1)}\left((m-p)T + \frac{T}{Q}\right) \\ \vdots \\ \tilde{h}^{(1)}\left((m-p)T + \frac{Q-1}{Q}T\right) \end{bmatrix} + \tilde{v}_m$$

$$= \sum_{p=-\infty}^{\infty} j^{p+1} a_p^{(1)} \tilde{h}_{m-p} + \tilde{v}_m = j^{m+1} \sum_{l=0}^{L} (j^{-l} \tilde{h}_l^{(l)}) a_{m-l}^{(l)} + \tilde{v}_m.$$

In essence, Q times oversampling provides an additional (Q−1) degrees of freedom. Note that $a_k$ is BPSK modulated, hence is real-valued. From equation (10), the total number of degrees of freedom can be doubled by first performing a derotation with a factor of $(-j)^{m+1}$ (block 810) followed by extracting the real and imaginary parts of the resulting signal (block 815). This can be expressible as:

$$\begin{bmatrix} \text{Re}(j^{-(m+1)}\tilde{r}_m) \\ \text{Im}(j^{-(m+1)}\tilde{r}_m) \end{bmatrix} = \sum_{l=0}^{L} \begin{bmatrix} \text{Re}(j^{-l}\tilde{h}_l^{(1)}) \\ \text{Im}(j^{-l}\tilde{h}_l^{(1)}) \end{bmatrix} a_{m-l}^{(1)} + \begin{bmatrix} \text{Re}(j^{-(m+1)}\tilde{v}_m) \\ \text{Im}(j^{-(m+1)}\tilde{v}_m) \end{bmatrix} \quad (11)$$

$$\Leftrightarrow r_m = \sum_{l=0}^{L} h_l a_{m-l} + v_m,$$

wherein the superscripts (1) indicating user 1 (the desired user) are suppressed for notational conciseness. This can then provide a single-input 2Q-output real-valued channel. Once again, the spectral redundancy inherent in the real-valued symbol $a_k$ can be exploited.

The oversampled received signal $r_m$ can then be processed by a space-time interference suppression matrix filter as follows (block 820):

$$y_m = \sum_{n=0}^{N} G_n r_{m-n} = G_0 r_m + \sum_{n=1}^{N} G_n r_{m-n}, \quad (12)$$

wherein $G_n \in \mathfrak{R}^{2Q \times 2Q}$ is the n-th tap of the space-time matrix filter. A detailed discussion of the space-time matrix filter is provided below. In the z-domain, $y(z)=G(z)r(z)=G(z)(h(z)a(z)+v(z))$. The processed 2Q-vector signal $y_m$ can serve as input to a desired user equalizer of type such as MLSE, DFE, or any other type of equalizer. The effective ISI channel for the equalizer can be expressed as $h_{eq}(z)=G(z)h(z)$.

The design of the filters ($w_1(z)$ and $w_2(z)$) involved the use of an algorithm that maximizes SINR. A different optimization can be used to design the space-time matrix filter $G(z)$. The space-time matrix filter $$G(z) = G_0 + \sum_{n=1}^{N} G_n z^{-n}$$

can be decomposed into two parts:

$G(z)=WF(z)$, where $$W = G_0 \text{ and } F(z) = I_{2Q} + \sum_{n=1}^{N} F_n z^{-n}. \quad (13)$$

The following criteria can be used:
  The first stage F(z) can be designed to suppress the total interference component v(z), without affecting the desired signal component h(z). Therefore, the first tap in F(z) may be $I_{2Q}$ (an identity matrix). Note that this stage may be optional. The stage can be deactivated by setting N to 0. Additionally, F(z) can also increase the effective channel constraint length (before equalization) by N.
  The second stage W may be chosen to spatially whiten the residual interference component after space-time interference suppression.

Using the assumption that the only available channel estimate for the desired user is available via the use of a channel estimation algorithm, such as a single-user correlator, single-user least square, joint least square, and so forth. This means that the algorithm is blind to the interference parameters. Given that the received signal r(z) and the desired user channel estimate $\hat{h}(z)$, the interference component v(z) can be estimated as follows:

$$\hat{v}(z)=r(z)-\hat{h}(z)\hat{a}(z), \quad (14)$$

wherein $\hat{a}(z)$ can be an estimate of the desired user data. The desired user data can be obtained by:
  v(z) can be estimated only within the mid-amble every transmission burst. In this case, $\hat{a}(z)$ is the desired user's training sequence, which is completely known.
  If additional data is desired, a decision-directed approach can be used. A preliminary data estimate (either hard or soft) can be obtained using the output of a matched filter or even the space-time interference suppression filter. The estimate can then be used in conjunction with the training sequence of the desired user to obtain a longer estimate of v(z). Alternatively, a per-survivor processing (PSP) technique can be used to obtain more accurate preliminary data estimates at the expense of complexity.

The interference estimate $\hat{v}(z)$ can then be used to compute F(z) according to an optimization criterion as follows:

$$\min_{F_1,\ldots,F_N} \sum_{m \in \Lambda} \left\| v_m + \sum_{n=1}^{N} F_n v_{m-n} \right\|^2 = \min_{F_1,\ldots,F_N} \sum_{m \in \Lambda} \|e_m\|^2, \quad (15)$$

wherein $e(z)=F(z)v(z)$ can be the residual interference after interference suppression and $\Lambda$ is an index set depending upon where v(z) is computed within a transmission burst. The optimization criterion in equation (15) can be viewed as a linear prediction problem. The solution can be obtained using any of many adaptive filtering algorithms or analytically as follows. Let $\Lambda=\{N, N+1, \ldots, M\}$ and define:

$$v = \begin{bmatrix} v_N \\ v_{N+1} \\ \vdots \\ v_M \end{bmatrix} \in \mathfrak{R}^{2Q(M-N+1)}, f = vec([F_1 \ F_2 \ \cdots \ F_N]) \in \mathfrak{R}^{4Q^2 N}$$

$$A = \begin{bmatrix} e_{N-1}^T & e_{N-2}^T & \cdots & e_0^T \\ e_N^T & e_{N-1}^T & \cdots & e_1^T \\ \vdots & \vdots & \ddots & \vdots \\ e_{M-1}^T & e_{M-2}^T & \cdots & e_{M-N}^T \end{bmatrix} \otimes I_{2Q}.$$

Then, the solution to equation (15) can be given as:

$$f_{opt} = \min_f \|v - Af\|^2 = (A^H A)^{-1} A^H v. \quad (16)$$

From $F_{opt}$, $$F_{opt}(z) = I_{2Q} + \sum_{n=1}^{N} F_{n,opt} z^{-n}$$

can be obtained.

The spatial whitening transformation, W, can be obtained from the residual interference estimate $e(z)=F_{opt}(z)\hat{v}(z)$. First, an estimate of the spatial covariance matrix can be obtained as follows:

$$R = \frac{1}{|\Lambda|} \sum_{m \in \Lambda} e_m e_m^T, \quad (17)$$

which can then be used to derive the spatial whitening transformation:

$$W = R_e^{-1/2}. \quad (18)$$

Note that when N=0, e(z)=v(z). Note also that W may be a function of an inverse of Re, i.e., the exponent of Re may have other values, such as −1 (or −⅓, −¼, −⅕, and so forth) instead of just −½ as shown in Equation (18) above.

For asynchronous communications systems where the interference may be present only within a part of a transmission burst, some decision-directed algorithm can be used to adapt the matrix filter, G(z), to changes in the interference structure. The algorithm can start from mid-amble (since the desired user training sequence is known) and then adapt from the center to the beginning and the end of each transmission burst. In this case, an efficient algorithm to update matrix inverses can also be used. The decision-directed adaptive algorithm can be based upon a host of standard adaptive filtering algorithms, such as, NLMS and RLS (Kalman filtering).

Figure 7:
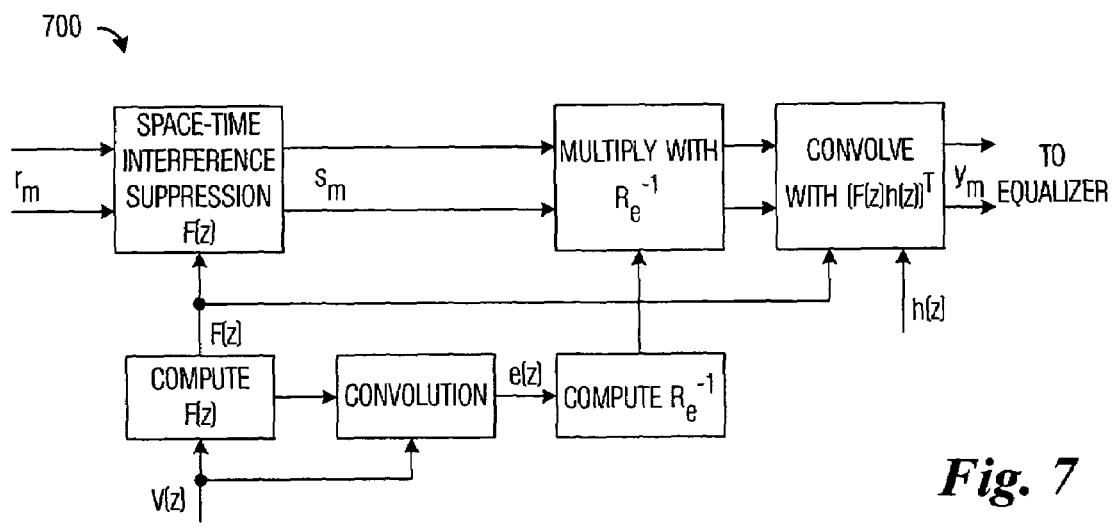
FIG. 7 is a diagram of a receiver circuit, according to a preferred embodiment of the present invention.

The computation of a square-root of a matrix is needed to compute the spatial whitening transformation (see equation (18)). This can increase receiver complexity significantly since it involves the computation of a symmetric matrix factorization. However, when an equalizer that uses matched filtering as a front-end is used, the square-root operation may be circumvented. In this case, the equalizer requires only the channel correlation estimates. The channel correlation polynomial can be expressed as:

$$\rho(z) = \|WF(z)h(z)\|^2 = h(z)^T F(z)^T R_e^{-1} F(z) h(z), \quad (19)$$

which does not require computing the square-root of $R_e^{-1}$. Such simplification can also be done for an MLSE equalizer when a front-end matched filter is used. In this case, the branch metric definition may need to be modified to take into account the noise correlation after matched filtering. FIG. 7 displays an embodiment of receiver circuitry 700 that takes advantage of this simplification.

After interference suppression (filtering and combining) and before being provided to an MLSE equalizer, it may be necessary to whiten (de-correlate) the interference suppressed signal (block 825). The interference suppressed signal can be severely colored (as a result of the filtering and combining operations). If this is the case, then the interference suppressed signal can be whitened (for example, by a whitening unit 650 (FIG. 6)). Severe coloring can impact the performance of MLSE. The whitening can be implemented adaptively using linear prediction filtering. Note that the process 800 may not be limited to co-channel interference suppression alone, the process 800 can also suppress adjacent channel interference.

Figure 9:
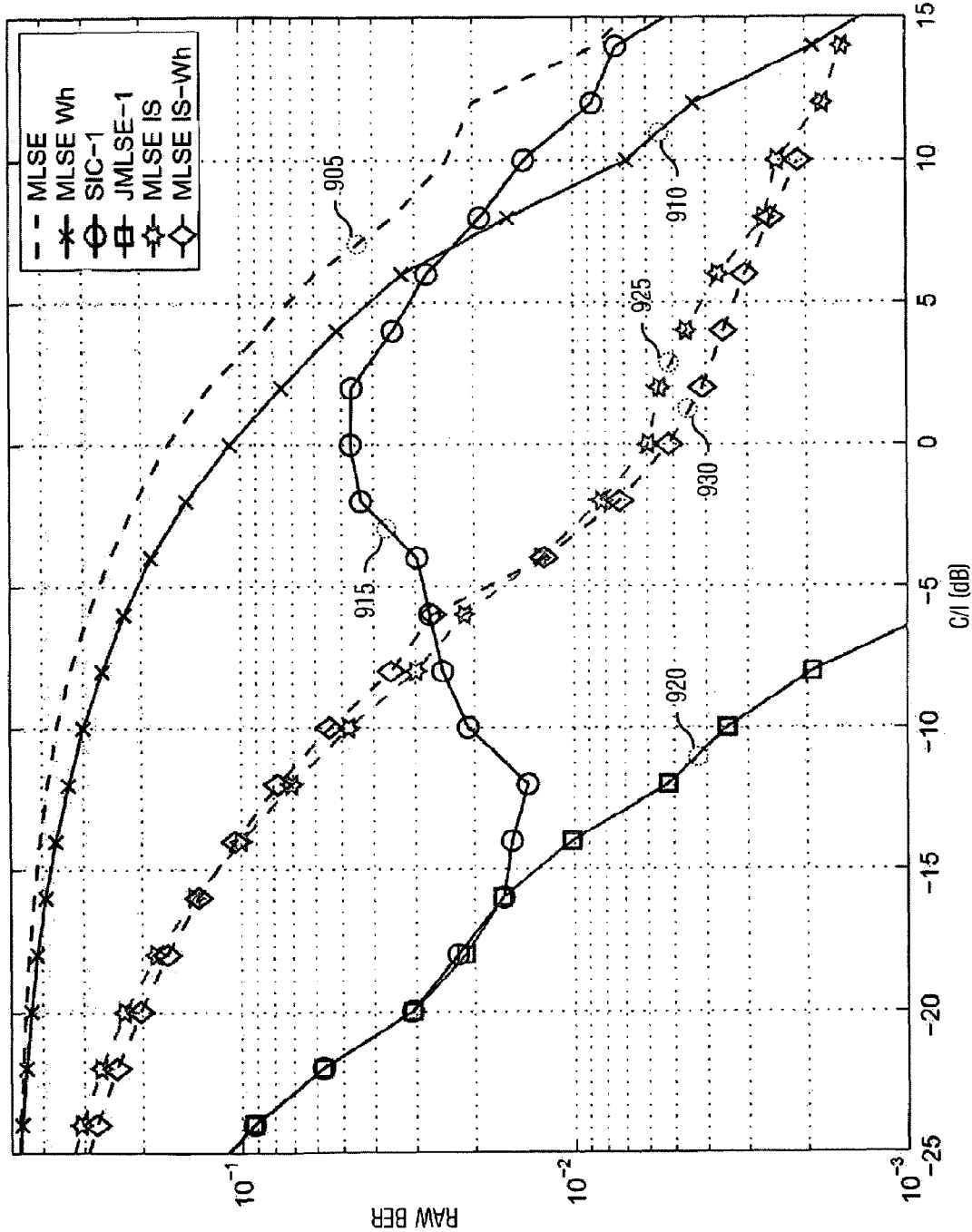
FIG. 9 is a data plot of link level performance for several single antenna interference cancellation algorithms, according to a preferred embodiment of the present invention.

With reference now to FIG. 9, there is shown a data plot illustrating a link level performance comparison of several single antenna interference cancellation algorithms in an environment with a single co-channel interferer, according to a preferred embodiment of the present invention. A first curve 905 displays the performance of a conventional MLSE algorithm, a second curve 910 displays the performance of a MLSE algorithm with pre-whitening prior to MLSE, a third curve 915 displays the performance of a successive interference canceling algorithm, a fourth curve 920 displays the performance of a joint MLSE algorithm, a fifth curve 925 displays the performance of an embodiment of the proposed interference suppression scheme (as displayed in FIG. 5) with no whitening, and a sixth curve 930 displays the performance of an embodiment of the proposed interference suppression scheme (as displayed in FIG. 5) with whitening. The performance results show that the joint MLSE algorithm outperforms the proposed interference suppression scheme with and without whitening. Note however, that the proposed interference suppression schemes permit a blind implementation, which is not possible with joint MLSE or successive interference cancellation.

Figure 10:
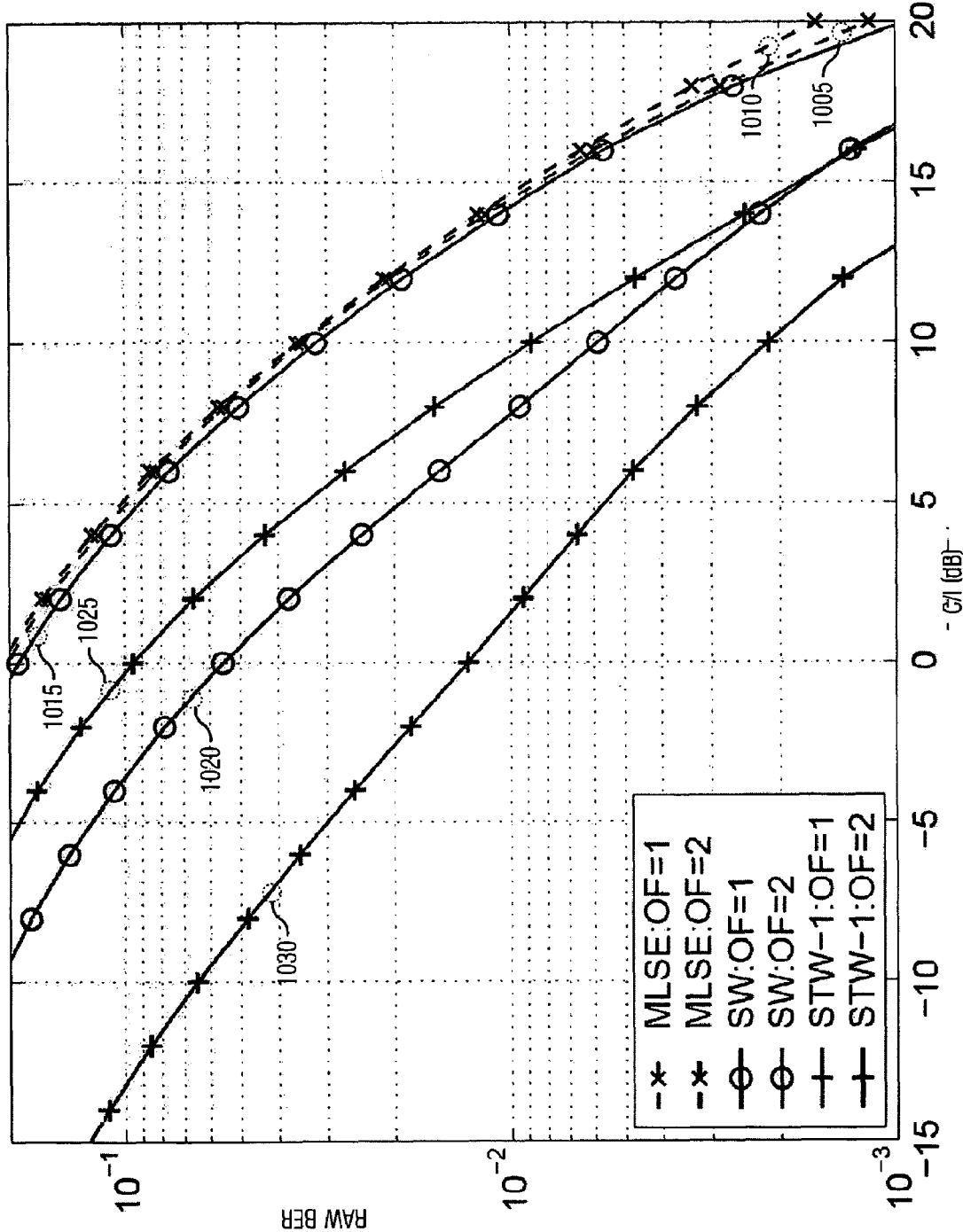
FIG. 10 is a data plot of link level performance for several single antenna interference cancellation algorithms, according to a preferred embodiment of the present invention.

With reference now to FIG. 10, there is shown a data plot illustrating a link level performance comparison of several single antenna interference cancellation algorithms (with and without oversampling) in an environment with a single co-channel interferer, according to a preferred embodiment of the present invention. A first and second curve 1005 and 1010 display the performance of conventional MLSE with oversampling factors of one (1) and two (2), a third and fourth curve 1015 and 1020 display the performance of an embodiment of the present invention (as displayed in FIG. 8, with N=0) with oversampling factors of one and two, a fifth and sixth curve 1025 and 1030 display the performance of an embodiment of the present invention (as displayed in FIG. 8, with N=1) with over sampling factors of one and two. The performance results show that 2× oversampling can provide significant gain over baud-rate sampling in the embodiments of the present invention. However, oversampling does not provide a performance gain for conventional MLSE receiver.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for eliminating interference in a received signal comprising:
    sampling the received signal to create a discrete time sequence representing the received signal, wherein the discrete time sequence comprises unseparated in-phase and imaginary portions;
    rotating the discrete time sequence by a specified amount;
    extracting in-phase and quadrature phase streams from the rotated, sampled received signal;
    applying an interference suppression filter to the in-phase and quadrature phase streams; and
    combining the filtered in-phase and quadrature phase streams.

2. The method of claim 1 further comprising after the combining, whitening the combined streams.

3. The method of claim 2, wherein the whitening can be performed via a temporal filter.

4. The method of claim 3, wherein the temporal filter can be implemented via a linear predictor.

5. The method of claim 1, wherein the sampling is at a sampling rate essentially equal to a symbol rate of the received signal.

6. The method of claim 5, wherein the in-phase stream is the real portion of the rotated, sampled received signal and the quadrature stream is the imaginary port ion of the rotated, sampled received signal.

7. The method of claim 5, wherein the interference suppression filter can be designed using a zero-forcing criteria.

8. The method of claim 5, wherein the interference suppression filter can be designed using a minimum mean square error criteria.

9. The method of claim 5, wherein the interference suppression filter can be designed using a maximum signal to interference plus noise (SINR) criteria.

10. The method of claim 9, wherein the interference suppression filter is of the form:

$$w = R_{rr}^{-1} H_1 u$$

wherein $u = evec_{max}[H_1^T R_{rr}^{-1} H_1]$ (the effective communications channel after interference suppression), $H_k$ is the $2(N+1) \times (L+N+1)$ block Toeplitz matrix formed from $\{h_0^{(k)}, h_1^{(k)}, \ldots, h_L^{(k)}\}$ (the channel impulse response), $R_{rr}^{-1}$ is the inverse of the matrix containing the rotated, sampled received signal, and $evec_{max}[X]$ denotes the eigenvector for matrix X corresponding to the maximum eigenvalue.

11. The method of claim 5, wherein one interferer can be fully suppressed.

12. The method of claim 5, wherein more than one interferer can be partially suppressed.

13. The method of claim 1, wherein the sampling is at a sampling rate that is greater than a symbol rate of the received signal.

14. A method for eliminating interference in a received signal comprising:
   sampling the received signal to create a discrete time sequence representing the received signal, wherein the discrete time sequence comprises unseparated in-phase and imaginary portions, wherein the sampling is at a sampling rate that is not less than a symbol rate of the received signal;
   rotating the discrete time sequence by a specified amount;
   extracting in-phase and quadrature phase streams from the rotated, sampled received signal; and
   applying an interference suppression filter to the in-phase and quadrature phase streams.

15. The method of claim 14 further comprising after the applying, whitening the in-phase and quadrature phase streams.

16. The method of claim 15, wherein the whitening can be performed by a spatial whitening transform, W, and wherein the spatial whitening transform is a function of an inverse of an interference covariance matrix estimate, wherein:

$$R = \frac{1}{|\Lambda|} \sum_{m \in \Lambda} e_m e_m^T,$$

wherein $e(z) = F(z)v(z)$ can be the residual interference after interference suppression, $F(z)$ is the interference suppression matrix, $\Lambda$ is an index set depending upon where $v(z)$ is computed within a transmission burst, and R is the interference covariance matrix estimate.

17. The method of claim 16, wherein the covariance matrix estimates can be derived from transmission training sequences.

18. The method of claim 16, wherein the covariance matrix estimates can be derived via decision feedback.

19. The method of claim 16, wherein $W = R_e^{-1}$.

20. The method of claim 16, wherein $W = R_e^{-1/2}$.

21. The method of claim 14, wherein the sampling is at a sampling rate that is greater than a symbol rate of the received signal.

22. The method of claim 21, wherein the sampling rate is an integer number times greater than the symbol rate.

23. The method of claim 22, wherein $2(Q-1)$ interferers can be fully suppressed, wherein Q is the oversampling rate.

24. The method of claim 22, wherein more than $2(Q-1)$ interferers can be partially suppressed, wherein Q is the oversampling rate.

25. The method of claim 21, wherein the interference suppression filter is a space-time interference suppression matrix.

26. The method of claim 21, wherein the interference suppression filter can be expressed as:

$$F_{opt}(z) = I_{2Q} + \sum_{n=1}^{N} F_{n,opt} z^{-n}$$

wherein $I_{2Q}$ is an identity matrix, $F_{n,opt}$ is an optimized interference suppression filter vector for a given n, and can be created by the following optimizing criterion:

$$\min_{F_1, \cdots, F_N} \sum_{m \in \Lambda} \left\| v_m + \sum_{n=1}^{N} F_n v_{m-n} \right\|^2 = \min_{F_1, \cdots, F_N} \sum_{m \in \Lambda} \|e_m\|^2$$

wherein $e(z) = F(z)v(z)$ can be the residual interference after interference suppression, N is the iterations through the interference suppression filter, and $\Lambda$ is an index set depending upon where $v(z)$ is computed within a transmission burst.

27. The method of claim 26, wherein when N=0, the interference suppression can be deactivated and only the spatial whitening matrix is used.

28. A circuit comprising:
   a sampling unit coupled to a signal input, the sampling unit containing circuitry to sample a received signal provided by the signal input at a specified sampling rate and to create a discrete time sequence representing the received signal, wherein the discrete time sequence comprises unseparated in-phase and imaginary portions;
   a rotating unit coupled to the sampling unit, the rotating unit containing circuitry to rotate the discrete time sequence by a specified amount;
   a pair of extractors coupled to the rotating unit, the extractors containing circuitry to extract an in-phase and a quadrature phase stream from an output of the rotating unit; and
   a filter coupled to the pair of extractors, the filter containing circuitry to suppress interference present in the received signal.

29. The circuit of claim 28 further comprising a whitening unit coupled to the filter, the whitening unit containing circuitry to de-correlate information present in the output of the filter.

30. The circuit of claim 28, wherein the filter comprises:
   a pair of filters, each filter to be applied separately to the in-phase and the quadrature phase streams; and
   a combiner coupled to the pair of filters, the combiner to sum the outputs from the pair of filters.

31. The circuit of claim 28, wherein the filter is a space-time interference suppression filter (STISF).

32. The circuit of claim 31 further comprising a whitening unit coupled to the STISF containing circuitry to de-correlate information present in the output of the STISF, wherein a transfer function of the STISF is computed from the output of the pair of extractors and captured training sequences from transmissions of a desired user.

33. The circuit of claim 32, wherein the transfer function is the sum of the output of the pair of extractors and a convolution of a channel estimate with the captured training sequences.

34. The circuit of claim 32, wherein the whitening unit applies a convolution of the transfer function of the STISF with a sum of the output of the pair of extractors and a convolution of a channel estimate with the captured training sequences.

35. The circuit of claim 28, wherein the circuit is used in a wireless receiver.

36. The circuit of claim 35, wherein the wireless receiver is used in a communications system wherein transmissions contain known training sequences.

37. The circuit of claim 36, wherein the wireless receiver is used in a communications system that is Global System for Mobile Telephony (GSM) compliant.

38. The circuit of claim 35, wherein the wireless receiver has a single antenna.

* * * * *